United States Patent
Moon et al.

(10) Patent No.: US 8,543,123 B2
(45) Date of Patent: Sep. 24, 2013

(54) METHOD AND APPARATUS FOR SCHEDULING RESOURCE ALLOCATION TO CONTROL INTER-CELL INTERFERENCE IN A CELLULAR COMMUNICATION SYSTEM, AND BASE STATION THEREOF

(75) Inventors: June Moon, Seoul (KR); Sung-Woo Park, Suwon-si (KR); Seung-Won Kang, Suwon-si (KR); Ho-Joong Kwon, Ansan-si (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 12/858,655

(22) Filed: Aug. 18, 2010

(65) Prior Publication Data
US 2011/0183679 A1    Jul. 28, 2011

(30) Foreign Application Priority Data
Jan. 22, 2010   (KR) ........................ 10-2010-0006223

(51) Int. Cl.
*H04W 72/00*    (2009.01)
*H04B 1/10*    (2006.01)

(52) U.S. Cl.
USPC ........ 455/450; 455/501; 455/452.1; 455/453; 455/522; 370/329; 370/318; 370/319

(58) Field of Classification Search
USPC .................. 455/296, 450, 452.1–452.2, 453, 455/464, 522, 67.13, 501; 370/329, 328, 370/252, 318, 319, 315, 316; 375/141; 514/14.3
See application file for complete search history.

(56) References Cited

U.S. PATENT DOCUMENTS

| | | | | |
|---|---|---|---|---|
| 2004/0190092 | A1* | 9/2004 | Silverbrook et al. | 358/539 |
| 2006/0209721 | A1* | 9/2006 | Mese et al. | 370/254 |
| 2007/0042784 | A1* | 2/2007 | Anderson | 455/450 |
| 2009/0129350 | A1* | 5/2009 | Khandekar et al. | 370/338 |
| 2009/0222329 | A1* | 9/2009 | Ramer et al. | 705/10 |
| 2009/0285151 | A1* | 11/2009 | Eidenschink et al. | 370/316 |
| 2009/0312042 | A1* | 12/2009 | Rudrapatna | 455/501 |
| 2010/0009691 | A1 | 1/2010 | Choi et al. | |
| 2010/0020757 | A1* | 1/2010 | Walton et al. | 370/329 |
| 2010/0056166 | A1* | 3/2010 | Tenny | 455/450 |
| 2010/0113060 | A1* | 5/2010 | Bai et al. | 455/453 |
| 2010/0142461 | A1 | 6/2010 | Miki et al. | |
| 2012/0033570 | A1* | 2/2012 | He et al. | 370/252 |
| 2012/0087276 | A1* | 4/2012 | Huang et al. | 370/253 |

FOREIGN PATENT DOCUMENTS

| | | |
|---|---|---|
| KR | 10-2009-0094552 A | 9/2009 |
| KR | 10-2009-0121368 A | 11/2009 |
| KR | 10-2009-0123472 A | 12/2009 |
| KR | 10-2010-0003692 A | 1/2010 |

* cited by examiner

Primary Examiner — Mahendra Patel
(74) Attorney, Agent, or Firm — Jefferson IP Law, LLP (57) ABSTRACT

A method and apparatus for controlling inter-cell interference in an evolved Node-B for a cellular communication system with a frequency reuse factor of 1 are provided. The apparatus includes a bitmap generator for receiving scheduling information from evolved Node-Bs of a plurality of neighbor cells, and for generating scheduling information including its cell's bitmap information for the resource allocation using the received neighbor cells' scheduling information, and a scheduler for scheduling the resource allocation for UEs in its cell based on the scheduling information provided from the bitmap generator and power allocation information of the UEs in its cell.

16 Claims, 6 Drawing Sheets

METHOD AND APPARATUS FOR SCHEDULING RESOURCE ALLOCATION TO CONTROL INTER-CELL INTERFERENCE IN A CELLULAR COMMUNICATION SYSTEM, AND BASE STATION THEREOF

PRIORITY

This application claims the benefit under 35 U.S.C. §119 (a) of a Korean Patent Application filed in the Korean Intellectual Property Office on Jan. 22, 2010 and assigned Serial No. 10-2010-0006223, the entire disclosure of which is hereby incorporated by reference.

BACKGROUND OF THE INVENTION

1. Field of the Invention

The present invention relates to a method and apparatus for controlling interference in a cellular communication system. More particularly, the present invention relates to a method and apparatus for controlling inter-cell interference in a base station of a cellular communication system in which a frequency reuse factor is 1.

2. Description of the Related Art

With the recent development of next-generation mobile communication systems, technologies to increase frequency transmission efficiency or spectral efficiency are under study in many aspects. It is widely known that the frequency transmission efficiency of a cellular communication system is maximized when a frequency reuse factor is 1. However, when the frequency reuse factor is 1 in the cellular communication system, the same frequency channels are reused in all base stations, causing inter-cell interference. More particularly, in urban areas where a required amount of data is relatively large, as the cell size is reduced, the inter-cell interference problem is serious.

In this case, an interference-limited environment occurs in which even though base stations increase their transmit power, the system capacity does not increase due to a corresponding increase in the inter-cell interference. In order to increase the frequency efficiency in this interference-limited environment, it is important to effectively control the inter-cell interference.

The inter-cell interference is closely related to a power/resource allocation pattern transmitted by each base station. Therefore, an inter-cell interference pattern varies depending on a power/resource allocation scheme used by each base station's scheduler. To effectively control the inter-cell interference, it is important to coordinate resource scheduling and allocation schemes among neighbor base stations. For this coordination, a Fractional Frequency Reuse (FFR) technology has been proposed. The FFR technology refers to a technology of dividing, for example, one cell (or sector) into two or more areas and setting a different frequency reuse factor in each of the divided areas. For example, in a case where the FFR technology is applied, the frequency reuse factor is set to 1 in an inner area (e.g., a cell center area) adjacent to the base station in the cell because an influence of the interference is relatively small, and the frequency reuse factor may be set to a value greater than 1 in an outer area (e.g., a cell boundary area) adjacent to the cell boundary because an influence of the interference is relatively large.

Figure 1:
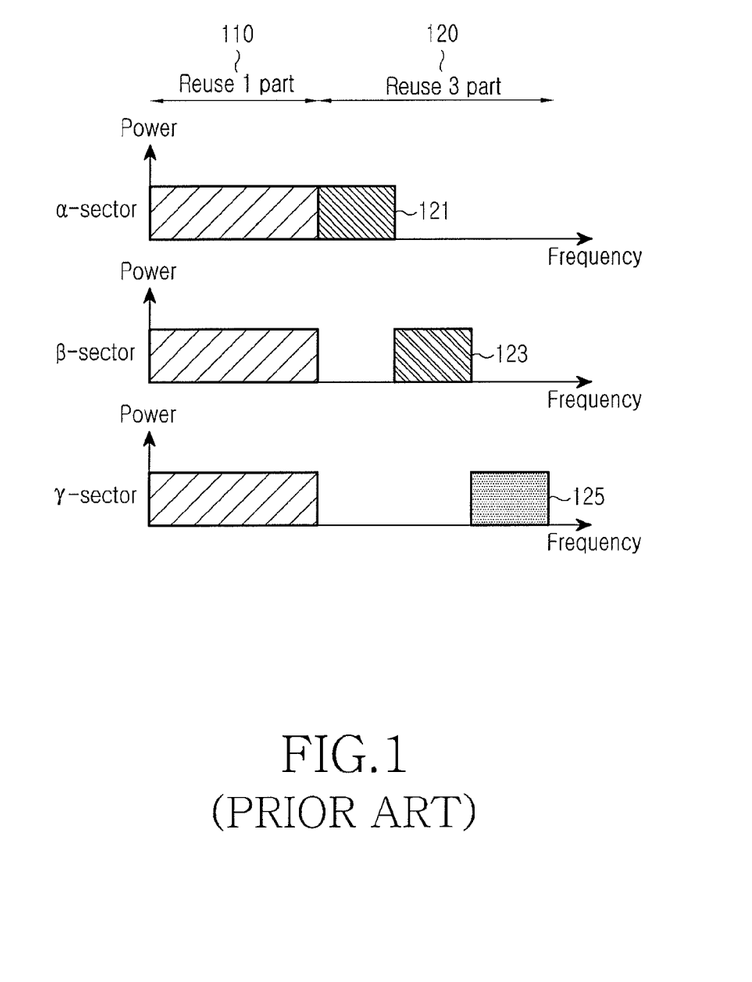
FIG. 1 is a diagram showing an example of a frequency allocation pattern in a cellular communication system using a Fractional Frequency Reuse (FFR) technology according to the related art.

FIG. 1 shows an example of a frequency allocation pattern in a cellular communication system using an FFR technology according to the related art. In this example, the cellular communication system is a 3-sector system using the FFR technology.

Referring to FIG. 1, when the FFR technology is applied, first resources 110 with a frequency reuse factor of 1 among all frequency resources are mainly allocated to users located in the cell center area where they are scarcely affected by inter-cell interference even though 3 neighbor sectors use the same frequency resources. Frequency resources 121, 123 and 125 allocated so as not to overlap between neighbor sectors among all frequency resources, e.g., among second resources 120 with a frequency reuse factor of 3, are mainly allocated to users located in the cell boundary area where they are significantly affected by inter-cell interference.

Use of the FFR technology may improve a Signal-to-Interference and Noise Ratio (SINR) in the cellular communication system, and improve throughputs of users in the cell boundary area, thereby contributing to an improvement of the overall system efficiency.

Among the second resources 120 in FIG. 1, the remaining resources, except for the frequency resources 121, 123 and 125 allocated to sectors α, β and γ, are not allocated so as mitigate interference to users in cell boundaries among the neighbor sectors. In the FFR technology, since the remaining resources are not used, available frequency resources are reduced, causing a decrease in the average sector capacity. To solve these problems, a so-called soft FFR technology has been proposed that uses the remaining resources unused in FFR as power-restricted resources that use little power, thereby using all available frequency resources while mitigating interference to the users in the cell boundaries between the neighbor sectors.

Figure 2:
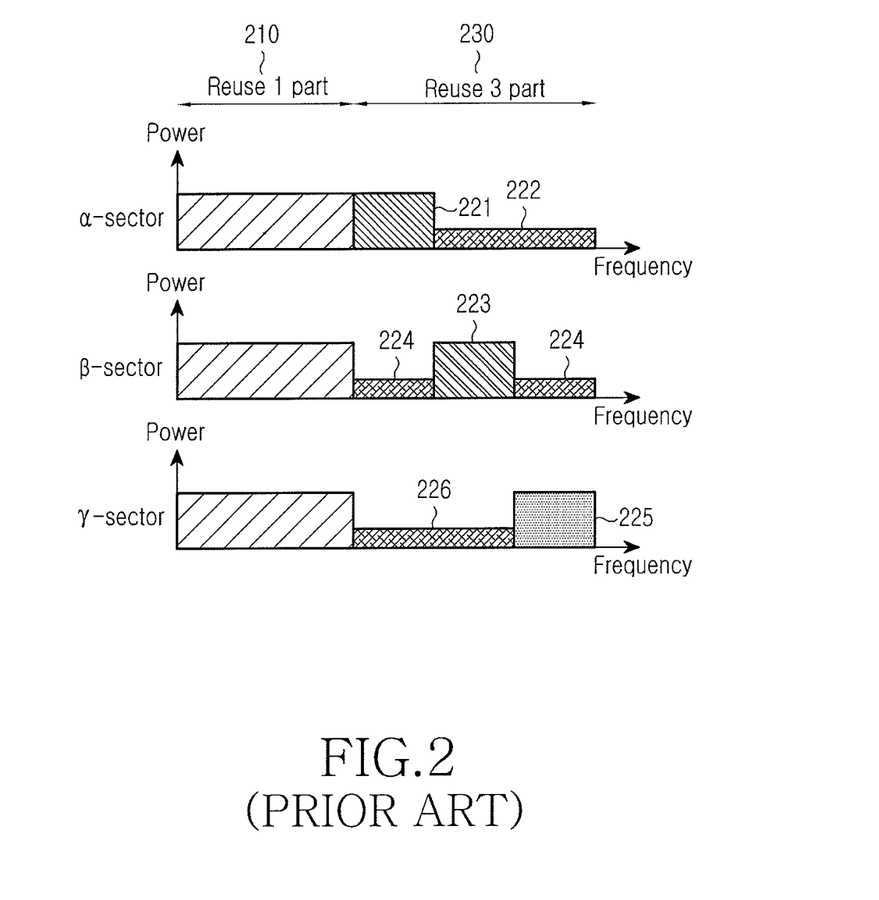
FIG. 2 is a diagram showing an example of a frequency allocation pattern in a cellular communication system using a soft FFR technology according to the related art.

FIG. 2 shows an example of a frequency allocation pattern in a cellular communication system using a soft FFR technology according to the related art.

Referring to FIG. 2, reference numerals 210 and 230 correspond to the first resources 110 with a frequency reuse factor of 1 and the second resources 120 with a frequency reuse factor of 3, respectively, which have been illustrated in FIG. 1. The soft FFR technology allocates the remaining resources 222, 224 and 226 excluding frequency resources 221, 223 and 225 allocated to their associated sectors α, β and γ from the second resources 230, as the power-restricted resources, thereby minimizing the reduction in the average sector capacity while improving throughputs of the users in the cell boundary areas.

The above FFR technology and soft FFR technology should determine inter-sector frequency allocation patterns during installation. Thus, the network manager should plan and set frequency allocation patterns for FFR and a restricted power level of the power-restricted resources according to the environment during network installation. After the network installation, if the cell environment is changed, the network manager needs to re-perform cell planning and manually change the frequency patterns.

Even though there is no change in the cell environment, if users are concentrated in the cell boundary area or the cell center area, it is necessary to instantaneously change the frequency allocation patterns according thereto. For example, if it is assumed that users are concentrated in the cell center area, it is optimal to operate the frequency reuse factor as 1 by using all frequency resources and power because all users in the cell are less affected by the inter-cell interference.

As another example, if it is assumed that all users are located in the cell boundaries, it is necessary to reduce resources allocated to the area with a frequency reuse factor of 1 and increase resources allocated to the area with a frequency reuse factor of 3, because all users in the cell are significantly affected by the inter-cell interference.

However, since the FFR technology and soft FFR technology use frequency allocation patterns that have been previously set by performing cell planning, it is not possible to control the inter-cell interference while adaptively varying resource allocation patterns according to the instantaneous change in the cell environment and/or the distribution of users.

SUMMARY OF THE INVENTION

An aspect of the present invention is to address at least the above-mentioned problems and/or disadvantages and to provide at least the advantages described below. Accordingly, an aspect of the present invention is to provide a method and apparatus for efficiently scheduling resource allocation to control inter-cell interference in a cellular communication system, and a base station using the same.

Another aspect of the present invention provides a scheduling method and apparatus for controlling inter-cell interference while adaptively varying a resource allocation pattern in a base station of a cellular communication system, and a base station thereof.

In accordance with an aspect of the present invention, an apparatus for scheduling resource allocation to control inter-cell interference in a cellular communication system is provided. The apparatus includes a bitmap generator for receiving scheduling information from evolved Node-Bs of a plurality of neighbor cells, and for generating scheduling information including its cell's bitmap information for the resource allocation using the received neighbor cells' scheduling information, and a scheduler for scheduling the resource allocation for User Equipments (UEs) in its cell based on the scheduling information provided from the bitmap generator and power allocation information of the UEs in its cell.

In accordance with another aspect of the present invention, a method for scheduling resource allocation to control inter-cell interference in a cellular communication system is provided. The method includes receiving scheduling information from evolved Node-Bs of a plurality of neighbor cells, generating its cell's bitmap information for the resource allocation using the received neighbor cells' scheduling information, and scheduling the resource allocation for UEs in its cell based on the generated bitmap information and power allocation information of the UEs in its cell.

In accordance with a further another aspect of the present invention, an evolved Node-B apparatus for scheduling resource allocation to control inter-cell interference in a cellular communication system is provided. The apparatus includes a communication interface for communicating with each of a plurality of neighbor cells' evolved Node-Bs and a plurality of UEs, a bitmap generator for receiving scheduling information from the plurality of neighbor cells' evolved Node-Bs, and for generating scheduling information including its cell's bitmap information for the resource allocation using the received neighbor cells' scheduling information, and a scheduler for scheduling the resource allocation for UEs in its cell based on the scheduling information provided from the bitmap generator and power allocation information of the UEs in its cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, 3rd Generation Partnership Project (3GPP), a standard group for a mobile communication technology, has guided the development of Inter-Cell Interference Coordination (ICIC) control using information exchanged between neighbor cells in a Long Term Evolution (LTE) system. The LTE system is the recently evolved version of the Wideband- Code Division Multiple Access (W-CDMA) system. An exemplary embodiment of the present invention to be described below proposes a scheduling method for controlling downlink interference using inter-cell exchange information, which can be applied to the LTE system. However, exemplary embodiments of the present invention may be applied not only to the LTE system, but also to various other cellular communication systems in which information exchange between cells is possible.

To this end, an exemplary embodiment of the present invention proposes a scheduling scheme for sharing information about an interference pattern between neighbor base stations to implement an FFR technology that adaptively changes a resource allocation pattern considering the cell environment and/or the real-time user distribution. The resources, an allocation pattern of which varies according to an exemplary embodiment of the present invention, may include at least one of frequency resources and power resources.

Figure 3:
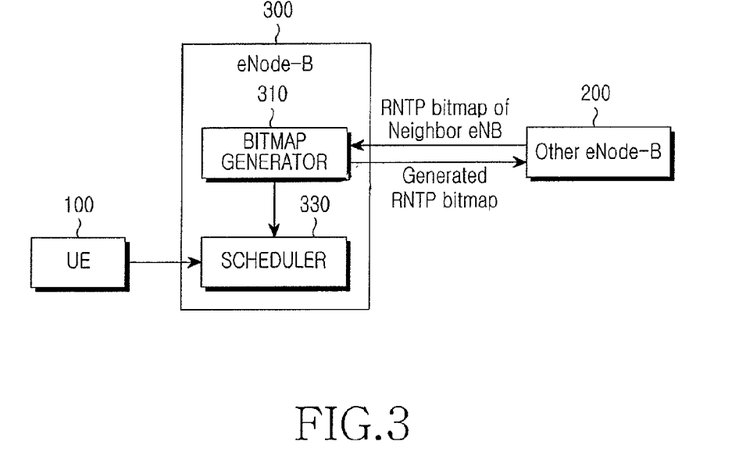
FIG. 3 is a block diagram showing a structure of an evolved Node B (eNode-B) performing inter-cell interference control in a cellular communication system according to an exemplary embodiment of the present invention.

FIG. 3 is a block diagram showing a structure of a base station or an evolved Node-B (eNode-B or eNB) performing inter-cell interference control in a cellular communication system according to an exemplary embodiment of the present invention.

Referring to FIG. 3, the eNode-B 300 includes a bitmap generator 310 and a scheduler 330 to perform Inter-Cell Interference Coordination (ICIC) by sharing scheduling information for inter-cell interference control with a neighbor eNode-B 200.

The structure of the eNode-B 300 may use a known interface as a communication interface for transmitting and receiving signals to/from the neighbor eNode-B 200 and a User Equipment (UE) 100, and a detailed description thereof will be omitted for brevity. While one UE 100 and one neighbor eNode-B 200 are shown in FIG. 3 for the sake of convenience, the eNode-B 300 preferably performs scheduling for inter-cell interference control according to an exemplary embodiment of the present invention by communicating with a plurality of UEs 100 and a plurality of neighbor eNode-Bs 200.

The bitmap generator 310 receives scheduling information from at least one neighbor cell's eNode-B 200 via an inter-eNB communication interface (not shown), generates scheduling information for its cell using the received neighbor cell's scheduling information and a scheduling result (scheduled_rate) of its cell, and provides the generated scheduling information to the scheduler 330. The bitmap generator 310 transmits the generated scheduling information to the neighbor cell's eNode-B 200 via a communication interface. Here, the scheduling information may include Relative Narrowband Transmit Power (RNTP) bitmap information.

The scheduler 330 schedules resource allocation and Adaptive Modulation Coding (AMC) for each UE 100 based on the scheduling information provided from the bitmap generator 310 and power allocation information of each UE 100 in its cell. The scheduler 330 determines a set of neighbor cells for generation of the RNTP bitmap using neighbor cells' Reference Signal Received Power (RSRP) that each UE 100 in its cell has measured and reported.

In an exemplary embodiment of the present invention, resource allocation for each UE 100 in the cell includes at least one of frequency resource allocation and power allocation, and the scheduler 330 schedules allocation of frequency resources and/or power resources using its cell's scheduling information generated based on the neighbor cells' scheduling information received from the neighbor cell's eNode-B 200, and power allocation information of each UE 100 in the cell. As a result, the eNode-B 300 may perform scheduling of adaptively varying a resource allocation pattern according to the change in the cell environment or the change in user distribution in the cell. The bitmap generator 310 and the scheduler 330 constitute a scheduling apparatus that performs scheduling for inter-cell interference control according to an exemplary embodiment of the present invention.

Figure 4:
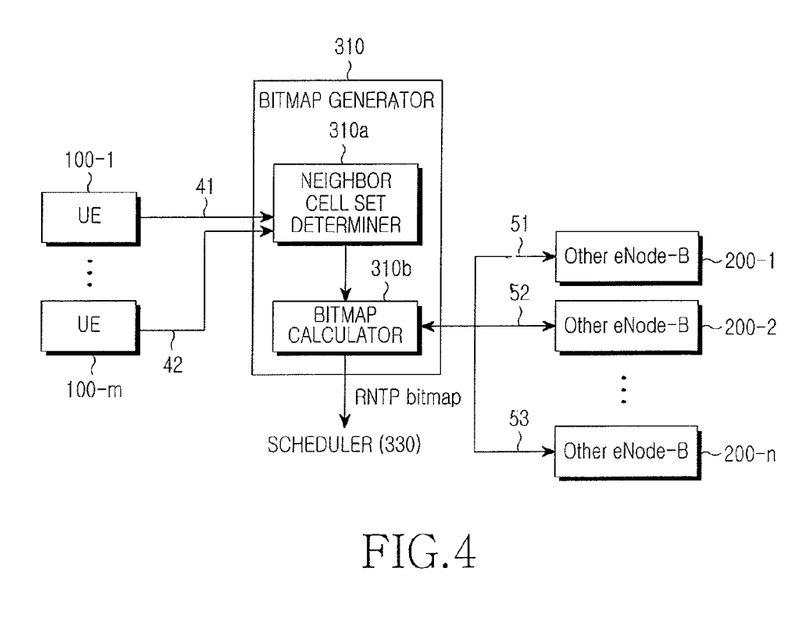
FIG. 4 is a block diagram showing a structure of a bitmap generator according to an exemplary embodiment of the present invention.

FIG. 4 is a block diagram showing a structure of a bitmap generator according to an exemplary embodiment of the present invention.

Figure 6:
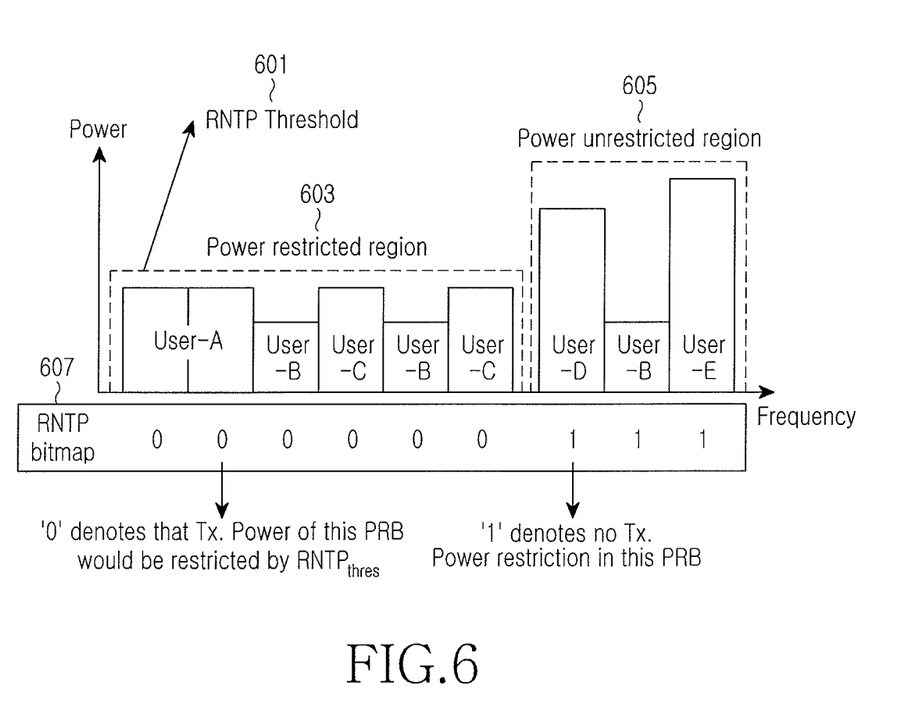
FIG. 6 is a diagram showing an example of power allocation to each Resource Block (RB) based on a Relative Narrowband Transmit Power (RNTP) bitmap in a Long Term Evolution (LTE) system according to an exemplary embodiment of the present invention.

An RNTP bitmap generated in the bitmap generator 310 is defined as a field in an inter-cell information exchange message in the 3GPP LTE standard, and each eNode-B may perform ICIC using the field information. In the LTE system, a length of the RNTP bitmap is defined as the number of Resource Blocks (RBs) in a downlink, and if an n-th bit in the RNTP bitmap is '0', it means that transmit power allocated to an n-th RB is less than or equal to a particular power level (i.e., an RNTP threshold). If an n-th bit in the RNTP bitmap is '1', it means that there is no restriction in transmit power allocated to an RB with an associated index. FIG. 6 is a diagram showing an example of power allocation to each RB based on the RNTP bitmap in the LTE system according to an exemplary embodiment of the present invention. While the number of RBs is assumed to be 9 for convenience only, the LTE system may actually use a plurality of RBs. In FIG. 6, reference numeral 601 represents the RNTP threshold, reference numeral 603 represents power-restricted resources allocated to UEs, to which the RNTP threshold is applied, and reference numeral 605 represents power-unrestricted resources to which the RNTP threshold is not applied. The power-restricted resources 603 and the power-unrestricted resources 605 may be set for each individual RB using each bit value of an RNTP bitmap 607 as shown in FIG. 6.

Referring to FIG. 4, the bitmap generator 310 includes a neighbor cell set determiner 310a and a bitmap calculator 310b.

The neighbor cell set determiner 310a receives RSRP information 41, . . . , 42 for neighbor cells from a plurality of UEs 100-1, . . . , 100-m via a communication interface (not shown), and determines a neighbor cell set for generation of the RNTP bitmap. The neighbor cell set determined for the RNTP bitmap generation by the neighbor cell set determiner 310a should consist of a small number of dominant cells capable of giving significant interference to UEs in its cell, and the neighbor cell set determiner 310a determines such a neighbor cell set. The neighbor cell set is updated each time neighbor cell's RSRP that UEs have measured and reported to the eNode-B, is received.

Figure 5:
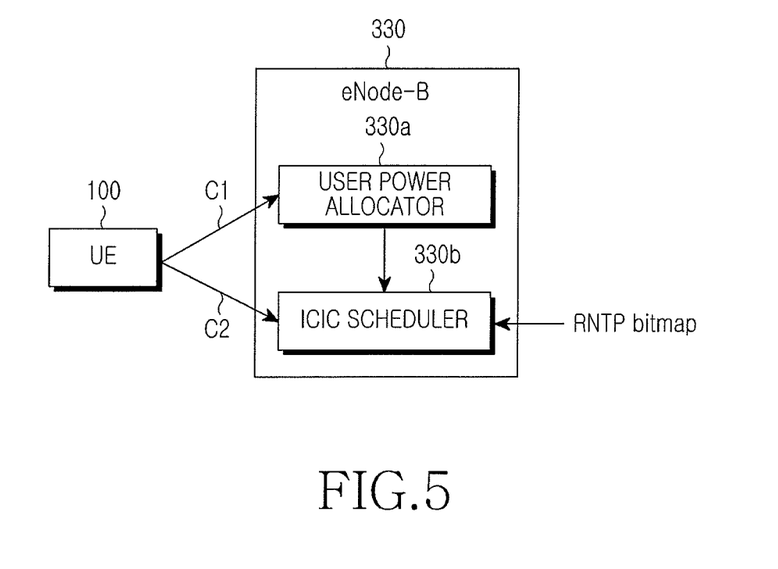
FIG. 5 is a block diagram showing a structure of a scheduler according to an exemplary embodiment of the present invention.

The bitmap calculator 310b receives from an ICIC scheduler 330b shown in FIG. 5 a scheduling result (scheduled_rate for each RB, or average rate scheduled for each RB) that has been calculated for a predefined time (T_ICIC ms), and generates its cell's RNTP bitmap using the received scheduling result (scheduled_rate), the neighbor cell set determined in the neighbor cell set determiner 310a, and scheduling information (i.e., RNTP bitmaps) 51, 52, . . . , 53 received from a plurality of neighbor cells' eNode-Bs 200-1, . . . , 200-n.

The bitmap calculator 310b receives neighbor cell set information from the neighbor cell set determiner 310a, and disregards RNTP bitmaps 51, 52, . . . , or 53 received from neighbor cells not included in the neighbor cell set information, among the plurality of neighbor cells' eNode-Bs 200-1, . . . , 200-n. The generated RNTP bitmap is given as an input to the scheduler 330, and it is provided to the neighbor cells' eNode-Bs 200-1, . . . , 200-n via an inter-eNB communication interface, and used during resource allocation scheduling by the eNode-Bs 200-1, ..., 200-n.

In FIG. 4, the cycle in which the bitmap calculator 310b updates the RNTP bitmap is equal to the predefined time (T_ICIC ms), and the predefined time (T_ICIC ms) is set relatively longer than a scheduling cycle (e.g., 1 ms in the LTE system) for resource allocation by the ICIC scheduler 330b.

FIG. 5 is a block diagram showing a structure of a scheduler according to an exemplary embodiment of the present invention.

Referring to FIG. 5, a scheduler 330 includes a user power allocator 330a for allocating a UE-specific power level according to a power allocation scheme of the present invention described below, and the ICIC scheduler 330b for performing resource allocation scheduling based on the present invention for, for example, every Transmission Time Interval (TTI) using scheduling information including the RNTP bitmap provided from the bitmap generator 310 in FIG. 3 and power allocation information of each UE 100 in the cell. In the LTE system, the TTI is set as 1 ms but this is merely an example. In an exemplary embodiment of the present invention, the scheduling cycle for resource allocation is not necessarily limited to 1 ms.

The user power allocator 330a allocates a UE-specific power level by receiving a Wideband Channel Quality Indicator (CQI) C1 from each UE 100 and setting a power level corresponding to the channel environment of each UE 100. How to allocate the UE-specific power level in an exemplary embodiment of the present invention will be described in more detail further below. The ICIC scheduler 330b receives a Subband CQI C2 from each UE 100, and schedules resource allocation and AMC for each UE 100 using the set UE-specific power level and the scheduling information including the RNTP bitmap provided from the bitmap generator 310. The Subband CQI C2 may be used to calculate an average rate scheduled_rate for RBs. The average rate scheduled_rate may be an averaged scheduling metric for each RB, or a value determined by averaging Subband CQIs C2 from UEs allocated to each RB.

Describing how the ICIC scheduler 330b allocates resources, in the case of an RB whose bit value is set as '1' in the RNTP bitmap, the ICIC scheduler 330b includes all UEs in a scheduling pool and performs resource allocation for the UE having the maximum scheduling metric. For an RB whose bit value is set as '0' in the RNTP bitmap, the ICIC scheduler 330b performs resource allocation for the UE having the maximum scheduling metric among only the UEs that have a UE-specific power level $P_A$ described below to meet the transmit power restriction 603 shown in FIG. 6.

Next, a detailed description will be made of a method for determining the neighbor cell set, a method for generating an RNTP bitmap, and a method for power allocation for each UE in an exemplary embodiment of the present invention.

Figure 7:
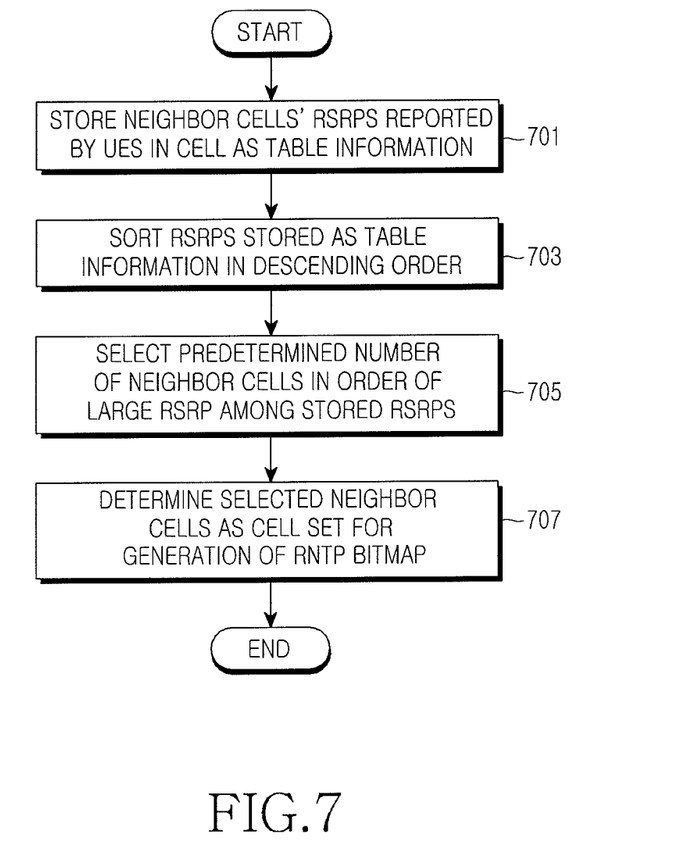
FIG. 7 is a flowchart showing a neighbor cell set determining method by a neighbor cell set determiner according to an exemplary embodiment of the present invention.

FIG. 7 is a flowchart showing a neighbor cell set determining method performed by a neighbor cell set determiner according to an exemplary embodiment of the present invention.

Referring to FIG. 7, in step 701, the neighbor cell set determiner 310a receives neighbor cells' RSRPs that UEs have measured and reported in its cell, and stores the received RSRPs as table information. The table information is stored to which, for example, a UE Identifier (ID), a cell ID and an RSRP corresponds. That is, if a UE with a UE ID #1 measures an RSRP of a neighbor cell with a cell ID #2 and reports the RSRP to an eNode-B, the neighbor cell set determiner 310a in the eNode-B stores the UE ID #1, the cell ID #2 and the reported RSRP so that they correspond to each other. Hence, the message by which the UE reports an RSRP to the eNode-B includes at least the UE ID, the cell ID, and the RSRP information.

In step 703, the neighbor cell set determiner 310a generates sorted table information by sorting the RSRPs stored as the table information in descending order. In step 705, the neighbor cell set determiner 310a selects a predefined number of neighbor cells corresponding to associated RSRPs so as not to overlap in the order of the large RSRP among the sorted RSRPs. In step 707, the neighbor cell set determiner 310a determines the selected neighbor cells as a neighbor cell set for generation of RNTP bitmaps.

Figure 8:
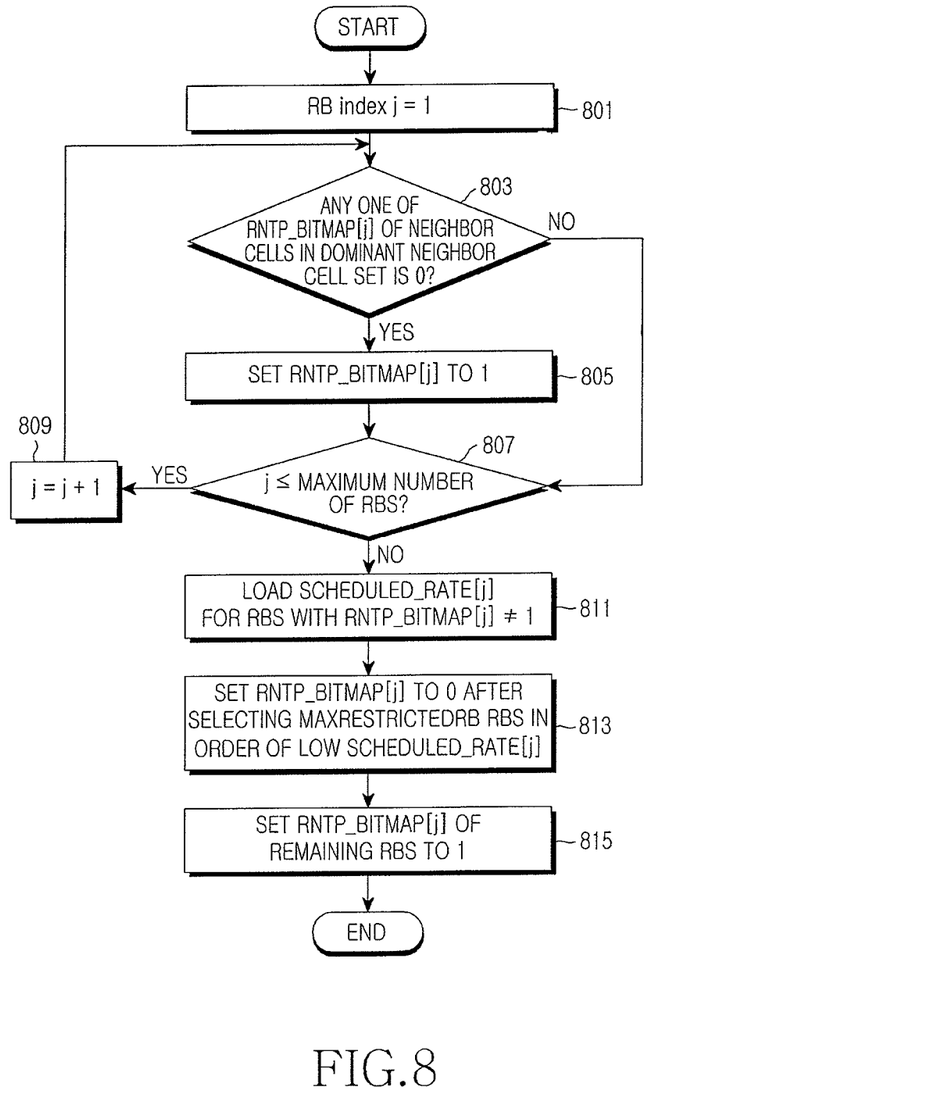
FIG. 8 is a flowchart showing a method for generating an RNTP bitmap by a bitmap calculator according to an exemplary embodiment of the present invention.

FIG. 8 is a flowchart showing a method for generating an RNTP bitmap in a bitmap calculator according to an exemplary embodiment of the present invention. A bitmap calculator 310b generates its cell's RNTP bitmap using neighbor cells' scheduling information (i.e., neighbor cells' RNTP bitmaps) received from the neighbor cells and its cell's scheduling result (RB-specific scheduled_rate, or average rate scheduled for each RB).

Referring to FIG. 8, after initializing an index (RB index j) of an RB to '1' in step 801, the bitmap calculator 310b checks RNTP bitmaps received from neighbor cells included in the neighbor cell set for each RB in step 803 to determine whether there is any RB whose bit value is '0' in the RNTP bitmaps. Here, a length of the RNTP bitmap is defined as the number of RBs, and if a j-th bit in the RNTP bitmap (where $1 \le j \le$ maximum number of RBs, and j is an integer) is '0', it denotes that transmit power allocated to a j-th RB is less than or equal to a particular power level (i.e., an RNTP threshold). If a j-th bit in the RNTP bitmap is '1', it denotes that there is no restriction in transmit power allocated to an RB with an associated index.

If it is determined in step 803 that there is not any RB whose j-th bit is '0' in neighbor cells' RNTP bitmaps, the bitmap calculator 310b sets a j-th bit in its cell's RNTP bitmap to '1' in step 805. In other words, if there is any neighbor cell in which there is power restriction to the particular power level, for a j-th RB, the bitmap calculator 310b sets the j-th bit in its cell's RNTP bitmap to '1' so as not to put transmit power restriction for the j-th RB. This is because when even at least one of neighbor cells belonging to a neighbor cell set affecting the interference has restriction on the power level, inter-cell interference is relatively reduced.

In step 807, the bitmap calculator 310b determines whether the RB index j is less than or equal to the maximum number of RBs available in the system. If it is determined in step 807 that the RB index j is less than or equal to the maximum number of RBs available in the system, the bitmap calculator 310b increases the RB index j by one in step 809, and then returns to step 803. However, if it is determined in step 807 that the RB index j exceeds the maximum number of available RBs, the bitmap calculator 310b loads RB-specific average rates scheduled_rates for the RBs whose bit values are not set in the RNTP bitmaps in step 811. In step 813, the bitmap calculator 310b selects a predefined number of RBs from among the RBs whose bit values in the RNTP bitmaps are not set to '1', in the order of the low average rate scheduled_rate, and then sets the pertinent bits of the RNTP bitmaps to '0'. The number of the selected RBs denotes the maximum number MaxRestrictedRB of RBs that can be set as power-restricted resources. The maximum number MaxRestrictedRB of RBs may be a predefined value, or a value that varies considering the change in the cell environment or the user distribution in the cell. In step 815, the bitmap calculator 310b sets to '1' all bit values of the remaining RBs whose bit values in the RNTP bitmaps are not set.

A description will now be made of a method for power allocation to each UE, performed by the user power allocator 330a of FIG. 5 according to an exemplary embodiment of the present invention.

In the LTE standard, a UE-specific transmit power density level (hereinafter referred to as a "UE-specific power level") $P_A$ is defined as, for example, 8 levels. The user power allocator 330a sets a user's power level as one of the 8 levels defined in the standard depending on the channel environment. During user power allocation, the user power allocator 330a sets power allocated to each UE using a variable filtered_wCQI that is set for each UE, and for example, 8 threshold constants wCQI_Th [0]~wCQI_Th [7] (wCQI_Th [0]<wCQI_Th[1]< . . . <wCQI_Th[7]) that the eNode-B has as internal variables.

The variable filtered_wCQI has a different value for each UE, meaning a value that the eNode-B has determined by filtering in the time domain a spectral efficiency calculated from the Wideband CQI (C1 in FIG. 5) received from each UE. The variable filtered_wCQI can be expressed as Equation (1) by reflecting a forgetting factor α set in the eNode-B.

$$\text{filtered\_wCQI} = (1-\alpha) \cdot \text{filtered\_wCQI} + \alpha \cdot \text{wCQI} \quad \text{Equation (1)}$$

where wCQI is a spectral efficiency calculated from the instantaneous Wideband CQI that has last been reported from a UE. When there are, for example, two wCQIs as the system operates Multiple Input Multiple Output (MIMO), a sum of the two wCQIs is the spectral efficiency.

A UE-specific power level $P_A$ is set based on the variable filtered_wCQI calculated using Equation (1), and by the LTE standard, a candidate $P_A$_candidate of the UE-specific power level $P_A$ may have a total of, for example, 8 values as in Equation (2).

$$P_A\_\text{candidate} = \{-6, -4.77, -3, -1.77, 0, 1, 2, 3\} \text{ dB} \quad \text{Equation (2)}$$

According to an exemplary embodiment of the present invention, a UE-specific power level $P_A$ is set among the candidates $P_A$_candidate by comparing the filtered_wCQI with the threshold constants wCQI_Th [0]~wCQI_Th [7] as in Equation (3).

1) If filtered_$wCQI$<$wCQI\_Th[0]$, $P_A$=$P_A$_candidate [7](=3 dB)

2) If $wCQI\_Th[k]$≤filtered_$wCQI$<$wCQI\_Th[k+1]$ ($k$=0, . . . , 5), $P_A$=$P_A$_candidate[6−$k$]

3) If filtered_$wCQI$≥$wCQI\_Th[6]$, $P_A$=$P_A$_candidate [0](=−6 dB)  Equation (3)

Equation (3) expresses that because a UE receives significant interferences from neighbor cells as the filtered_wCQI is smaller, a relatively high power level is allocated to the UE as a Carrier-to-Interference Noise Ratio (CINR) is lower. While it has been described in the above-described exemplary embodiment that the UE-specific power level is divided into 8 levels for allocation, the number of power levels may increase or decrease.

As is apparent from the forgoing description, when scheduling for resource allocation is performed by applying the ICIC control technology according to an exemplary embodiment of the present invention, performances of users in the cell boundary area are improved in the system with a frequency reuse factor of 1.

In addition, according to exemplary embodiments of the present invention, pre-cell planning is not needed like the FFR technology of the related art, thereby enabling simple installation of the system. Also, system performance may always be kept in the optimized state by adaptively changing the frequency/power allocation pattern according to the change in the cell environment and/or the change in user distribution.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for scheduling resource allocation to control inter-cell interference in a cellular communication system, the apparatus comprising:
a bitmap generator for receiving scheduling information from evolved Node-Bs of a plurality of neighbor cells, and for generating scheduling information including its cell's bitmap information for the resource allocation using the received neighbor cells' scheduling information; and
a scheduler for scheduling the resource allocation for User Equipments (UEs) in its cell based on the scheduling information provided from the bitmap generator and power allocation information of the UEs in its cell,
wherein the bitmap generator determines a neighbor cell set for generation of the bitmap information by selecting a predefined number of neighbor cells from among the plurality of neighbor cells,
wherein the bitmap generator receives Reference Signal Received Power (RSRP) information for the plurality of neighbor cells from the UEs in its cell to generate the bitmap information,
wherein the predefined number of neighbor cells is selected according to the RSRP information in descending order of the RSRP, and
wherein the bitmap information comprises its cell's Relative Narrowband Transmit Power (RNTP) bitmap information.

2. The apparatus of claim 1, wherein its cell's Relative Narrowband Transmit Power (RNTP) bitmap information is generated using the neighbor cells' RSRP information.

3. The apparatus of claim 2, wherein the bitmap generator is adapted to generate its cell's RNTP bitmap using RNTP bitmap information received from the plurality of neighbor cells and Resource Block (RB)-specific average rate information provided from the scheduler.

4. The apparatus of claim 1, wherein the bitmap generator comprises:
a neighbor cell set determiner for receiving Reference Signal Received Power (RSRP) information for neighbor cells from a plurality of UEs via a communication interface, and for determining a neighbor cell set for generation of Relative Narrowband Transmit Power (RNTP) bitmap; and
a bitmap calculator for receiving from an Inter-Cell Interference Coordination (ICIC) scheduler a scheduling result and for generating RNTP bitmap using the received scheduling result.

5. The apparatus of claim 1, wherein the scheduler is adapted to receive instantaneous Wideband Channel Quality Indicator (CQI) from each of the plurality of UEs and allocate a UE-specific power level depending on a channel environment of each UE.

6. The apparatus of claim 5, wherein the scheduler is adapted to allocate the UE-specific power level using a value obtained by filtering a spectral efficiency calculated from the instantaneous Wideband CQI in a time domain.

7. The apparatus of claim 6, wherein the scheduler is adapted to allocate a relatively high power level to a pertinent UE as the filtered value is smaller.

8. The apparatus of claim 1, wherein the scheduler comprises:
- a user power allocator for allocating a UE-specific power level according to a power allocation scheme; and
- an Inter-Cell Interference Coordination (ICIC) scheduler for performing resource allocation scheduling for every Transmission Time Interval (TTI) using scheduling information including Relative Narrowband Transmit Power (RNTP) bitmap provided from the bitmap generator.

9. A method for scheduling resource allocation to control inter-cell interference in a cellular communication system, the method comprising:
- receiving scheduling information from evolved Node-Bs of a plurality of neighbor cells;
- generating its cell's bitmap information for the resource allocation using the received neighbor cells' scheduling information; and
- scheduling the resource allocation for User Equipments (UEs) in its cell based on the generated bitmap information and power allocation information of the UEs in its cell,
- wherein the generating of its cell's bitmap information comprises determining a neighbor cell set for generation of the bitmap information by selecting a predefined number of neighbor cells from among the plurality of neighbor cells,
- wherein the generating of its cell's bitmap information comprises receiving Reference Signal Received Power (RSRP) information for the plurality of neighbor cells from the UEs in its cell,
- wherein the generating of its cell's bitmap information comprises selecting the predefined number of neighbor cells from among the plurality of neighbor cells in descending order of the RSRP, and
- wherein the bitmap information comprises its cell's Relative Narrowband Transmit Power (RNTP) bitmap information.

10. The method of claim 9, wherein the generating of its cells bitmap information comprises sorting the RSRP information received from the plurality of neighbor cells in descending order.

11. The method of claim 9, wherein its cell's Relative Narrowband Transmit Power (RNTP) bitmap information is generated using the neighbor cells' RSRP information.

12. The method of claim 11, wherein the generating of its cell's bitmap information comprises generating its cell's RNTP bitmap using Resource Block (RB)-specific average rate information and RNTP bitmap information received from the plurality of neighbor cells.

13. The method of claim 9, wherein the scheduling of the resource allocation comprises receiving an instantaneous Wideband Channel Quality Indicator (CQI) from each of the plurality of UEs and allocating a UE-specific power level according to a channel environment of each UE.

14. The method of claim 13, wherein the scheduling of the resource allocation comprises allocating the UE-specific power level using a value obtained by filtering a spectral efficiency calculated from the instantaneous Wideband CQI in a time domain.

15. The method of claim 14, wherein the scheduling of the resource allocation comprises allocating a relatively high power level to a pertinent UE as the filtered value is smaller.

16. An evolved Node-B apparatus for scheduling resource allocation to control inter-cell interference in a cellular communication system, the apparatus comprising:
- a communication interface for communicating with each of a plurality of neighbor cells' evolved Node-Bs and a plurality of User Equipments (UEs);
- a bitmap generator for receiving scheduling information from the plurality of neighbor cells' evolved Node-Bs, and for generating scheduling information including its cell's bitmap information for the resource allocation using the received neighbor cells' scheduling information; and
- a scheduler for scheduling the resource allocation for UEs in its cell based on the scheduling information provided from the bitmap generator and power allocation information of the UEs in its cell,
- wherein the bitmap generator determines a neighbor cell set for generation of the bitmap information by selecting a predefined number of neighbor cells from among the plurality of neighbor cells,
- wherein the bitmap generator receives Reference Signal Received Power (RSRP) information for the plurality of neighbor cells from the UEs in its cell to generate the bitmap information,
- wherein the predefined number of neighbor cells is selected according to the RSRP information in descending order of the RSRP, and
- wherein the bitmap information comprises its cell's Relative Narrowband Transmit Power (RNTP) bitmap information.

* * * * *